United States Patent [19]

Niggl

[11] 4,091,183

[45] May 23, 1978

[54] ACCUMULATOR HAVING DEFORMATION RESISTING CONDUCTING CORE

[76] Inventor: Hans Niggl, Engesserstr. 4, Freiburg, Germany, D-7800

[21] Appl. No.: 787,559

[22] Filed: Apr. 14, 1977

[51] Int. Cl.² ............................................. H01M 4/70
[52] U.S. Cl. .................................... 429/138; 429/143; 429/209; 429/246
[58] Field of Search ......................... 429/129, 130-133, 429/136, 138, 143, 144, 146, 147, 208, 209, 233, 237, 239, 245, 246

[56] References Cited

U.S. PATENT DOCUMENTS

| | | | |
|---|---|---|---|
| 540,185 | 5/1895 | Payen | 429/136 |
| 852,569 | 5/1907 | Lyndon | 429/138 |
| 915,063 | 3/1909 | Bender | 429/209 |
| 963,284 | 7/1910 | Fitz | 429/143 |
| 1,190,989 | 7/1916 | Engel | 429/209 |
| 1,403,394 | 1/1922 | Drambourg | 429/209 |
| 2,084,964 | 6/1937 | Smith | 429/138 |
| 2,117,382 | 5/1938 | Wells | 429/143 |
| 2,198,845 | 4/1940 | Smithers | 429/146 |
| 2,490,630 | 12/1949 | Jardine | 429/138 |
| 2,511,887 | 6/1950 | Vinal | 429/144 |
| 3,201,280 | 8/1965 | Yumoto | 429/131 |

Primary Examiner—Anthony Skapars
Attorney, Agent, or Firm—Peter K. Kontler

[57] ABSTRACT

The major surfaces of a solid plate-like conductive core in an accumulator are adjacent to slabs of positive active material which are flanked by porous layers consisting of sintered synthetic plastic material or of compacted glass wool, synthetic plastic filaments or rock wool. A sheath consisting of polyvinyl chloride has a chamber which receives the core, the slabs and the layers and is formed with vertical slots for the passage of electrolyte. The major surfaces of the core are profiled to enlarge the area of contact with active material, and the inner sides of the layers are also profiled to enlarge the area of contact with the outer sides of the slabs.

21 Claims, 3 Drawing Figures

U.S. Patent  May 23, 1978  4,091,183
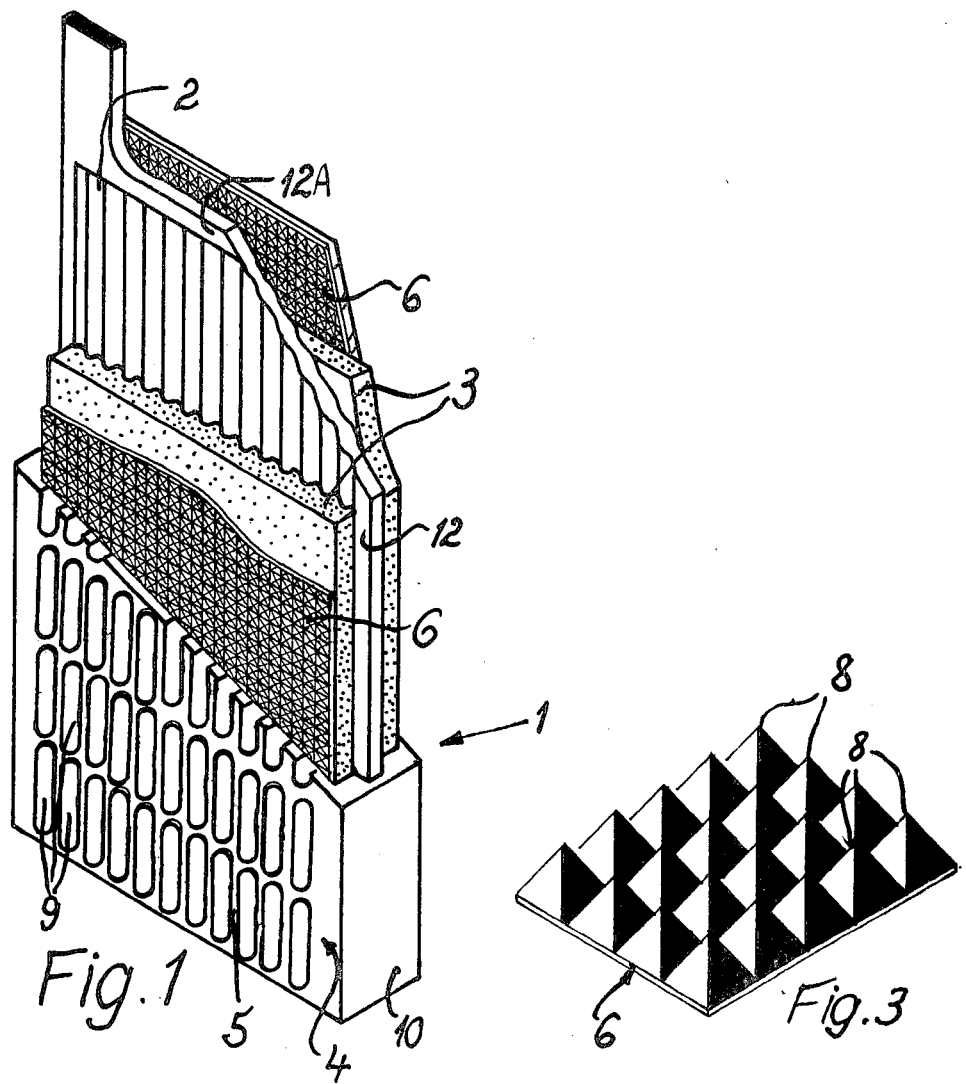
Fig.1
Fig.3
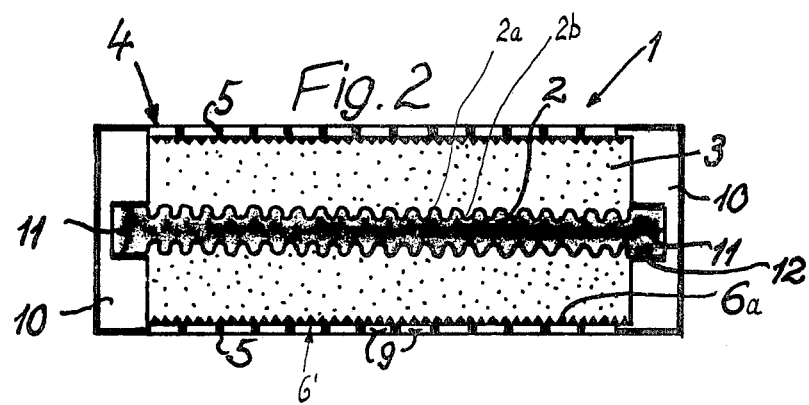
Fig.2

ACCUMULATOR HAVING DEFORMATION RESISTING CONDUCTING CORE

BACKGROUND OF THE INVENTION

The present invention relates to accumulators or storage batteries in general, and more particularly to improvements in accumulators of the type wherein the conducting core and a body of paste-like active material are confined in an envelope.

In presently known accumulators of the above outlined character, the envelope normally consists of synthetic plastic material. The core constitutes a grid (which has holes for active material) or a rod. A drawback of such accumulators is that the useful life of the core is much shorter than that of a box-shaped negative plate.

OBJECTS AND SUMMARY OF THE INVENTION

An object of the invention is to provide an accumulator with a novel and improved conducting core whose useful life is longer than the useful life of presently known cores.

Another object of the invention is to provide an accumulator wherein the conductive core is more resistant to deformation than the cores of conventional storage batteries.

A further object of the invention is to provide novel and improved means for confining the conductive core and the positive active material which surrounds the core.

An additional object of the invention is to provide an accumulator which, when given a deep discharge, is less likely to allow for such pronounced deformation of the core as to result in damage to the separators and/or in contact with the neighboring plates.

The invention is embodied in a combination of elements which form part of an accumulator or storage battery and include a solid-plate like conductive lead-containing core, a body of active material which surrounds at least the major part of the exterior of the core (such active material may form two slabs which are in full surface-to-surface contact with the two major surfaces of the core), and an envelope which confines the active material. The envelope includes porous layers which surround the active material and may consist of sintered synthetic plastic material, of compacted rock wool, synthetic plastic filaments or glass fibers, or of other suitable material which is highly resistant to corrosive action of electrolyte and can stand elevated temperatures. The envelope may further comprise an outer housing or sheath having a chamber for the aforedescribed elements. The side walls of the sheath are outwardly adjacent to the respective major surfaces of the core and have apertures (preferably vertical slots) which permit the electrolyte to penetrate through the pores of the layers and to thus reach the active material. The inner surfaces of the layers are undulated, serrated, provided with ridges and grooves or protuberances, or otherwise profiled to enlarge the area of contact with the active material.

The novel features which are considered as characteristic of the invention are set forth in particular in the appended claims. The improved accumulator itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a portion of an accumulator which embodies one form of the invention;

FIG. 2 is a horizontal sectional view of the structure which is shown in FIG. 1 but showing two modified layers; and FIG. 3 is an enlarged fragmentary perspective view of one of the layers shown in FIG. 1.

DESCRIPTION OF THE PREFERRED EMBODIMENTS

Referring first to FIGS. 1 and 2, there is shown a portion or unit 1 of an accumulator or storage battery which comprises a solid plate-like conducting core 2, two panels or slabs 3 of active material which are adjacent to the major surfaces of the core 2, and a confining envelope including two porous layers 6 which flank the outer sides of the slabs 3. The envelope preferably further comprises a flat block-shaped apertured synthetic plastic housing or sheath 4 having a chamber which confines the elements 2, 3 and 6. The side walls 5 of the sheath 4 are adjacent to the exposed sides on surfaces of the respective layers 6.

The inner sides or surfaces of the layers 6 are profiled, i.e., they exhibit pronounced raised and recessed portions which can be seen in FIG. 3. Such profiling results in pronounced increase of the areas of surfaces which contact the outer sides of the slabs 3 and urge the slabs against the respective major surfaces of the conducting core 2. The material of the layers 6 is preferably formed with minute pores.

The area of the inner surface of each layer 6 can be increased in a number of ways, e.g., by imparting to such inner surface an undulate or serrated shape or by providing the inner surface with longitudinally extending alternating ribs and grooves. In accordance with one presently preferred embodiment (see FIG. 2), the inner surfaces of the layers 6' have a large number of relatively small ridges 6a the cross-section of each of which resembles an isosceles or equilateral triangle. Neighboring ridges 6a have abutting edges. The extent to which the profiling increases the thickness of the respective layers 6' may be in the range of 1–2 mm, preferably about 1.5 mm. Less pronounced profiling could result in rapid filling of grooves or other forms of recessed surface portions with lead sulphate. For example, the length of the sides of triangles shown in FIG. 2 at the inner sides of layers 6' may be within the aforementioned range (1–2 mm). Such layers can be produced at relatively low cost and the areas of their profiled surfaces greatly exceed the areas of equally large flat surfaces. The profiling of the inner surfaces of the layers should not be too pronounced because this would reduce the space which is available for the active material (slabs 3).

FIG. 3 shows another presently preferred embodiment of the profiling of a layer. The layer 6 which is shown therein consists of a large number of hollow pyramids 8 whose square bases are located in a common plane and each of which has four sides each resembling an equilateral triangle. The configuration of FIG. 3 has been found to be especially suited for use in the improved accumulator because it insures a highly satisfactory contact between the slabs 3 and the electrolyte. Such contact is not impeded (or is impeded to a lesser extent) by development of lead sulphate barriers.

As mentioned above, the pyramids 8 of FIG. 3 are hollow, i.e., the thickness of the material of the layers 6 may be constant or nearly constant. Otherwise stated, each protuberance (pyramid 8) at that side of a layer 6 which faces the respective slab 3 is located opposite a complementary recess or depression at the outer side of the same layer. Such uniform thickness of the porous layers insures that the electrolyte can pass through each and every zone thereof, including the apices of the pyramids. The layers 6 or 6' can be produced by deep drawing, injection molding, press-forming or or by resorting to any other suitable technique. The inclination of the planes of the sides of each pyramid with respect to the plane of the respective base is preferably between 60° and 70°.

The layers 6 and 6' can consist of sintered or filamentary synthetic plastic material, compacted glass fibers or rock wool, or any other material which exhibits high resistance to acids and can stand elevated temperatures.

The pyramids 8 of FIG. 3 are but one of a wide variety of protuberances which can constitute the profiling of inner surface of the layer 6. For example, the illustrated pyramidal protuberances can be replaced with hollow prismatic, conical, frustoconical, cylindrical or partly conical and partly cylindrical protuberances. A feature common to all such protuberances is that the inner surface of the layer is profiled in several directions, i.e., that it exhibits raised and recessed portions in a direction at right angles to the longitudinal direction of the core 2 (this also applies for the profiling 6a which is shown in FIG. 2) as well as in the longitudinal direction of the core. The provision of discrete protuberances instead of ridge-like protuberances (6a) renders it possible to increase (almost by 100 percent) the quantity of active material in the recessed portions of the inner surface of the layer. With reference to FIG. 3, this means that the quantity of active material which fills the spaces between the common plane of the bases and the common plane of the apices of the pyramids 8 is nearly twice the quantity of active material which fills the grooves between the ridges 6a of one of the layers 6' shown in FIG. 2 (it being assumed, of course, that the height of the pyramids 8 equals or closely approximates the height of the ridges 6a).

By increasing the area of the inner surface of each layer 6 or 6', one insures a more satisfactory contact between the electrolyte and the active material, even at maximum load and in spite of the development of lead sulphate barriers.

As mentioned above, porous layers (6) having a substantially constant thickness (in spite of the protuberances 8) offer less resistance to the passage of electrolyte than layers (6') whose thickness varies, either periodically (as shown in FIG. 2) or at random.

It is also within the purview of the invention to omit the sheath 4, i.e., to confine the part 2 and the slabs 3 in an envelope which consists of porous material and is sufficiently stable to maintain the slabs 3 in contact with the respective major surfaces of the core 2. Alternatively, the layers 6 or 6' can be omitted if the sheath 4 consists of porous material, and especially if the inner surfaces of the sheath are profiled in a manner as described in connection with the inner surfaces of the layers 6 and 6'. The walls of such sheath are functional equivalents of the layers 6 or 6'.

If the improved accumulator utilizes a sheath 4 for each group of elements 2, 3, 6 or 2, 3, 6', the sheath may consist of polyvinyl chloride.

The apertures or holes 9 in the side walls 5 of the sheath 4 are preferably relatively large elongated slots which extend lengthwise of the sheath, i.e., they are vertical when the accumulator embodying the improved structure is in use. This enhances the stability of the sheath 4 without interfering with the flow of electrolyte into contact with the outer sides of the layers 6.

The narrow end walls 10 of the sheath 4 are formed with centrally located longitudinal internal grooves or channels 11 which receive the respective longitudinal marginal portions 12 of the core 2. The insertion of marginal portions 12 into the respective channels 11 results in satisfactory anchoring and enhances the stability of the core, i.e., the core is less likely to buckle or to undergo other types of deformation. Moreover, the channels 11 insure convenient and predictable insertion of the core 2 into the sheath 4. Still further, limited buckling or other deformation of the plate-like core will not result in excessive shift from the desired optimum position in the center of the chamber which is defined by the sheath 4.

In accordance with a further feature of the invention, at least one major surface of the core 2 is profiled to thus enlarge the area of contact between such side and the respective slab 3. FIGS. 1 and 2 show that the cross-section of the core 2 has an undulate outline, i.e., the two major surfaces of the core are formed with longitudinally extending rounded ribs 2a which alternate with recesses 2b bounded by rounded surfaces. The profiled portions of the major surfaces of the core 2 are surrounded by a non-profiled rectangular reinforcing frame 12A which includes the aforementioned vertical marginal portions 12. The frame surrounds the central portion and contributes to stability of the core 2. Also, the smooth surfaces of the portions 12 facilitate the insertion of core 2 into the channeled sheath 4.

The profiling of major surfaces of the core 2 enhances the passage of current and hence the effectiveness of the core. Moreover, such configuration of the major surfaces prolongs the useful life of the core. It is preferred to stagger the ribs and recesses of one major surface with respect to the ribs and recesses of the other major surface in such a way that each rib of one major surface is located directly opposite a rib in the other major surface, and vice versa.

It is equally within the purview of the invention to provide the core 2 with one profiled surface. Profiling which includes ribs and grooves extending in the longitudinal direction of the core 2 enhances the stability of the core. When the accumulator is in use, the ribs 2a and grooves 2b are vertical or nearly vertical.

Of course, the major surfaces of the core 2 could be profiled in a number of other ways without departing from the spirit of the invention. In each instance, the profiling enlarges the areas of the respective major surfaces, and this reduces the current strength (i.e., the density of current) per unit area which, in turn, reduces the extent of corrosion during charging and discharge (i.e., the useful life of the core is longer).

The profiling of the major surfaces of the core 2 and/or of the inner surfaces of the layers 6 or 6' exhibits another important advantage. Thus, the protuberances or projections of the core and/or of the layers prevent undesirable sinking of active material. Moreover, the effectiveness of the improved structure, even during relatively short intervals of overload, is superior to that of conventional Ironclads or the like. It has been found that the core 2 exhibits a much greater resistance to deformation than a conventional grid or rod. Furthermore, even a very pronounced deformation cannot result in contact with a neighboring plate because of the provision of an envelope (layers 6 or 6', sheath 4, or a sheath plus porous layers). The slabs 3 are profiled at both sides, i.e., the areas of both major surfaces of each slab 3 greatly exceed the areas of flat surfaces. This reduces the likelihood of excessive accumulations of lead sulphate at the major surfaces of the core, even in the event of deep discharge.

The construction of the remaining components (including the container for electrolyte) of the accumulator forms no part of the invention.

To summarize: The improved structure exhibits very pronounced mechanical stability while offering little resistance to the flow or electrolyte into contact with the slabs 3. This allows for short-lasting overloading. The discharge curve of an accumulator which embodies the improved structure is highly satisfactory and the useful life of the core 2 as well as of other components is surprisingly long. The enlargement of major surfaces of the core 2 reduces the current density per unit area which reduces the electrochemical corrosion during charging and discharging. Moreover, the solid core 2 can stand such corrosive effects for much longer periods of time than a grid or rod of conventional design. The slabs 3 are properly confined from all sides so that they are unlikely to sink; at the same time, the slabs are readily accessible to the electrolyte.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In an accumulator, the combination of a solid plate-like conductive core; a body of active material contacting at least the major portion of the exterior of said core; and an envelope which confines said active material, including porous layers surrounding said body, said layers having inner surfaces in substantially continuous contact with said body and at least one of said surfaces being profiled.

2. The combination of claim 1, wherein said core has two major surfaces and said body includes slabs sandwiched between said layers and the respective major surfaces.

3. The combination of claim 1, wherein the cross-section of said profiled inner surface includes raised and recessed portions.

4. The combination of claim 3, wherein said raised portions are ridges having a triangular cross-sectional outline.

5. The combination of claim 1, wherein the height of said raised portions is in the range of 1 to 2 mm.

6. The combination of claim 1, wherein said profiled inner surface comprises a plurality of protuberances.

7. The combination of claim 6, wherein said protuberances are pyramids each having a square base and four sides disposed in planes making an angle of between 60° and 70° with the plane of the respective base.

8. The combination of claim 1, wherein the layer having said profiled inner surface has a substantially constant thickness.

9. The combination of claim 1, wherein said layers consist of deep-drawn, extruded or molded synthetic plastic material.

10. The combination of claim 1, wherein said envelope consists of said layers.

11. The combination of claim 1, wherein said envelope further includes a hollow apertured sheath having a chamber for said core, said body and said layers.

12. The combination of claim 11, wherein said sheath consists of polyvinyl chloride.

13. The combination of claim 11, wherein the apertures of said sheath are elongated slots which are substantially vertical when the accumulator is in use.

14. The combination of claim 11, wherein said core is elongated and includes two longitudinally extending marginal portions, said sheath including two apertured side walls and two end walls, at least one of said end walls having an internal channel for the respective marginal portion of said core.

15. The combination of claim 1, wherein said core has two major surfaces in contact with said active material and at least one of said major surfaces is profiled.

16. The combination of claim 15, wherein said core is elongated and said one major surface has alternating longitudinally extending ribs and grooves.

17. The combination of claim 16, wherein said ribs and grooves are substantially vertical when the accumulator is in use.

18. The combination of claim 15, wherein each of said major surfaces is profiled and each of said major surfaces includes raised and recessed portions, each raised portion of one of said major surfaces being located opposite a raised portion of the other of said major surfaces, and vice versa.

19. The combination of claim 1, wherein said core includes a central portion and a reinforcing frame surrounding said central portion.

20. The combination of claim 1, wherein said layers consist of acid-resistant material.

21. The combination of claim 20, wherein the material of said layers is selected from the group consisting of sintered synthetic plastic material, compacted glass fibers, compacted synthetic plastic filaments and compacted rock wool.

* * * * *